(12) United States Patent
Hansson et al.

(10) Patent No.: US 6,226,279 B1
(45) Date of Patent: May 1, 2001

(54) ALLOWING SEVERAL MULTIPLE ACCESS SCHEMES FOR PACKET DATA IN A DIGITAL CELLULAR COMMUNICATION SYSTEM

(75) Inventors: Rolf Hansson, Kungsängen; Anders Herlitz, Älta; Lars Frid, Stockholm, all of (SE)

(73) Assignee: Telefonaktiebolaget L M Ericsson (publ) (CH)

( * ) Notice: Subject to any disclaimer, the term of this patent is extended or adjusted under 35 U.S.C. 154(b) by 0 days.

(21) Appl. No.: 08/956,073

(22) Filed: Oct. 22, 1997

(51) Int. Cl.$^7$ .............. H04Q 7/00; H04J 3/16; H04B 7/212

(52) U.S. Cl. .......... 370/329; 370/328; 370/346; 370/347

(58) Field of Search .................. 370/329, 347, 370/349, 337, 389, 346, 442, 449, 462, 458, 230, 235, 236, 252; 379/59, 60

(56) References Cited

U.S. PATENT DOCUMENTS

| | | |
|---|---|---|
| 4,534,061 | 8/1985 | Ulug ............................ 455/17 |
| 4,868,811 | 9/1989 | Suzuki . |
| 5,012,469 | 4/1991 | Sardana ........................ 370/95.3 |
| 5,276,703 | 1/1994 | Budin et al. ................... 375/1 |
| 5,491,741 | 2/1996 | Farwell et al. . |
| 5,502,721 | 3/1996 | Pohjakallio . |
| 5,537,395 | 7/1996 | Alles et al. . |
| 5,544,158 | 8/1996 | Oprea et al. . |
| 5,590,133 | * 12/1996 | Billstrom et al. .............. 370/349 |
| 5,598,416 | 1/1997 | Yamada et al. . |
| 5,673,259 | * 9/1997 | Quick, Jr. ...................... 370/342 |
| 5,729,531 | * 3/1998 | Raith et al. .................... 370/252 |
| 5,790,551 | * 8/1998 | Chan ............................. 370/458 |
| 5,901,142 | * 5/1999 | Averbuch et al. ............. 370/329 |
| 5,903,552 | * 5/1999 | Raith ............................. 370/377 |

FOREIGN PATENT DOCUMENTS

| | | |
|---|---|---|
| 0 744 849 A2 | 11/1996 | (EP) . |
| 96/37079 | 11/1996 | (WO) . |
| 97/38502 | 10/1997 | (WO) . |
| PCT/Se98/01884 | 3/1999 | (WO) . |

OTHER PUBLICATIONS

GSM Technical Specification—GSM 0.460, Sep. 26, 1996.
Europe Media, Lassay–Les–Chateaux, FR, Sep. 1993, "GSM System for Mobile Communications", M. Mouly et al., XP–002063457.

* cited by examiner

Primary Examiner—Hassan Kizou
Assistant Examiner—Duc Ho
(74) Attorney, Agent, or Firm—Jenkens & Gilchrist

(57) ABSTRACT

A digital radio network having a first single random access for packet data is enhanced by providing a second access which includes a second random access channel for controlled short data messages and a polled data channel for larger data messages. All mobiles operating within the system can access the first channel but only dual-mode mobiles can connect to the second access.

23 Claims, 4 Drawing Sheets

- Downlink Signalling Format for Control Channel — 41

| R | P | CAC | SW | CC | CAC | E |
|---|---|-----|----|----|-----|---|
| 4 | 2 | 112 | 20 | 8  | 112 | 22 |

E: Collision Control bits,

- Structure of Collision Control Bits:

ALLOWING SEVERAL MULTIPLE ACCESS SCHEMES FOR PACKET DATA IN A DIGITAL CELLULAR COMMUNICATION SYSTEM

CROSS REFERENCE TO RELATED APPLICATIONS

This application is related to U.S. patent application Ser. No. 08/955,664, filed on even date herewith in the name of the same inventors and entitled "Access Scheme for Packet Data in a Digital Cellular Communications System" which is hereby incorporated by reference herein.

BACKGROUND OF THE INVENTION

1. Field of the Invention

The present invention relates to radio telecommunications and, more particularly, to a packet data telecommunication system for a cellular radio network.

2. Description of the Related Art

In radio telecommunications, such as cellular radio systems, digital modulation schemes, such as time division multiple access (TDMA), are used to transmit both control information and voice traffic over the radio network. In addition, in recent years the transmission of data between computers and other data processing devices over the radio network is increasingly common. One technique which is used for the handling of data traffic over the radio network is circuit switched data services in which a dedicated circuit between transmitting and a receiving station conveys the data from one to the other. An attractive alternative to such circuit switched data services for operators of mobile telephony networks are packet data services. The use of packet data switching enables several mobile users to share the available channel capacity within the system. This technique is well suited to modern data communication applications since data transmissions are usually of a bursty nature and thus do not continuously require a dedicated communications circuit.

A number of different channel access schemes are commonly used in radio communication systems. Each such access scheme has distinct advantages and disadvantages for various applications. For example, fixed assignment access schemes within a radio telecommunications system are used for circuit switched services such as conventional voice telephony and fax. Although not yet widely used in cellular systems, polling schemes may also be employed to enhance the frequency efficiency of a radio system. The most common scheme used for multiple access in a radio system are random access schemes, conventionally employed in many cellular radio telecommunications systems.

In conventional mobile packet radio communication systems, a base station (BS) communicates with a plurality of mobile stations (MSs) over one or more shared packet radio channels. Downlink packet traffic is scheduled by the base station, so that downlink contention between mobile stations is avoided. However, in order for the mobile stations to gain access to the base station on the uplink, they must compete using a random multiple access protocol which inevitably leads to contention and multiple collisions between the different mobile stations which are competing with one another for access on the uplink. Referring to FIG. 1, there is shown a simplified block diagram of a radio communications system which includes facilities for transferring packet data to and from a mobile station. The system 10 includes a communication network 12 which includes a base station/transceiver section 14. The network 12 can be a public land mobile network (PLMN) such as the Personal (formerly, Pacific) Digital Cellular (PDC) system, a digital TDMA cellular radio network.

Network 12 communicates with a mobile station 16 which has the capacity of sending and receiving packet data, via a base station 14 using existing air interface and switching communication protocols. The network 12 also communicates with other mobile stations 20 via a second base station 18 in the network 12, fixed telephones 22 in a public switch telephone network (PSTN), and terminal work stations 24 and 26. As shown, the communication between computer terminal 24 and network 12 are made over a wired line connection. The communication between computer terminal 26 and the network 12 are via a wireless radio connection through base station 14. Consequently, communications to and from phone 22 and computer terminals 24 and 26 can be routed to and from the mobile stations 20 and 16 by means of a network 12.

Referring next to FIG. 2, there is shown the channel structure of an illustrative air interface in a cellular radio system of the type illustrated in FIG. 1 which accommodates random access packet data channel. The channel structure includes a broadcast channel (BCCH) which is used by the network to broadcast various information to mobile stations such as channel allocation and system information. A set of common control channels (CCCH), including a paging channel (PCH) and a single cell signaling channel (SCCH) are used for transmitting signal information. The PCH is used to page a mobile station while the SCCH is used for transmitting information between the network and the mobile units, for example, requests by a mobile seeking access to the network. The uplink channel of the SCCH is of the random access type. A user packet channel (UPCH) is a channel which is available to multiple users for the transmission of user packet data. The uplink channel of the UPCH is also a random access type.

The appended control channels (ACCH) comprise an auxiliary channel appended to the traffic channel (TCH) for transmitting signal information between the network and the mobile station. The ACCH is further divided into the slow appended control channel (SACCH) which comprises a data channel carrying continuous system administration information such as measurement reports from each mobile of received signal strength measurements obtained for both its presently serving cell and adjacent cells. The fast appended control channel (FACCH) is also appended to a TCH and is a channel which temporarily steals the TCH to perform high speed transmissions. A housekeeping channel (RCH) sometimes replaces the SACCH and is used for transmitting maintenance information on the radio channel. Finally, the traffic channel (TCH) is used for transferring encoded speech and circuit switched user data. It is often further divided into full rate TCH and a half rate TCH for encoded speech.

It is conventional today to use the random access method for uplinking data transfer from a mobile station on the user packet channel (UPCH). The channel structure of the cell is communicated to the mobile users within that cell through the information transmitted on the broadcast channel (BCCH). For example, in the PDC system there is broadcast on the BCCH (and on other channels from time to time) a broadcast information message which contains numerous mandatory and optional parameters, including packet channel structure information and channel restriction information. The latter comprises one octet of data of which a small number of the possible 256 bit combinations are used to indicate to the mobile whether or not particular channels are restricted from access by those mobiles.

In accordance with conventional random access procedures, as soon as the user packet data channel (UPCH) is idle, all mobile users which want to send user data packets to the network will simultaneously compete for the use of that channel. If there is only one access during this competition phase, that user will get hold of the channel and remain its user until the complete data packet has been sent. During the time when the user utilizes the channel, no other mobile seeking to transmit a data packet will try to access it. However, if during the competition phase there is more than one user which simultaneously accesses the channel, a collision occurs and a maximum of one, or often none of those competing users, will get data through the channel. In such cases, each failing user must wait a random time period before it can make a new attempt to seize the channel.

The use of shared random access data channels in conventional packet services within radio networks has numerous disadvantages. For example, during high traffic loads and long packet messages, the probability of a mobile station being able to send its data packets is dramatically reduced and a mobile must wait an inordinately long period of time for the channel to become free so that it can even attempt to access it.

As illustrated in FIG. 3, each of the two mobile stations 31 and 32, equipped respectively for handling packet data from two portable computers 31a and 32a receive information broadcast on the downlink of the air interface, 33 and 34 respectively. Each mobile 31 and 32 receives the same information 35 broadcast on the BCCH. If both of the mobile stations 31 and 32 seek to send packet data to the network, they both listen for information on the BCCH indicating the availability of a random access user data channel (UPCH). An algorithm which uses the mobile's own unique identity (MSI) as one input parameter attempts to spread the mobiles evenly over the available channels. We assume each of the two mobiles 31 and 32 find the same UPCH 38 when applying the algorithm. If their respective access data packets 36 and 37 do not collide and obliterate one another when received at the base station, the packets 36 and 37 are successfully delivered to the network. If, instead, two user packets 36 and 37 collide, then its likely that neither of the two mobile stations 31 or 32 succeeds to access the channel and both must wait a random period of time before it make a new attempt to access the channel. The random access control process in a digital mobile radio communication system of the PDC type illustrated in FIGS. 1 and 3, is shown in FIG. 5.

Once a mobile successfully has started sending a packet it will continue to complete that packet. Each packet transfer is done under competition with other mobiles. FIG. 4 illustrates the layer 1 view of an uplink access scheme if we assume MS1 "has" the channel.

It is obvious that the more MSs that the algorithm allots to the same UPCH, the higher the risk of colliding packets.

In FIG. 5, the downlink user packet channel UPCH, and signaling channel SCCH, include a collision control field 41. This field is labeled E and, in this example, is 22 bits in length. This information is used by the mobile station during random access. Processing of the collision control bit field E at the base station comprises the processing of several subfields including the setting of an I/B field 42 to the bits "111" if the uplink UPCH is idle and to "000" if the uplink UPCH is busy. An R/N field 43 is set by the base station to "111" if valid information was received on the UPCH channel in the previous slot and to "000" if no valid information was received on the UPCH channel in the previous slot. The PE field 44 is set to all zeros if the channel is idle or no message was received. If a message is received on the UPCH channel, the detected and checked (CRC) (16 bits) from the UPCH message received from the mobile station are used as a partial echo in the PE field 44 in the downlink transmission.

With respect to processing of the packet data information in the mobile station, when the mobile station has data to send, it sequentially checks UPCH channels for an idle condition and starts the transmission. Next it looks for the R/N and PE fields to confirm that the first packet unit was correctly received by the base station. If this did not occur, the mobile station will, after a random delay, look again for an idle UPCH channel and try to retransmit its packet.

Referring next to FIG. 6, an example of random access control between two mobile stations in an illustrative digital cellular system of the PDC type is illustrated. In this example, two mobile stations MS1 and MS2 each have a packet to transmit to the network. The packets both consist of two bursts on the UPCH channel. The sequence of events corresponds to the sequence of circled numbers in FIG. 6. First, the uplink UPCH is idle, which is indicated by the E field on the downlink UPCH, and thus both mobiles start transmission of their packets. Second, the base station is able to receive the first packet burst from MS2 uncorrupted and responds accordingly by setting the following indications in the E field on the downlink: I/B field: B=B (busy); and R/N field: =R (burst received); and PE field: the CRC value from the burst received from MS2. Thirdly, MS2 detects that the PE field contains the CRC from the burst it has transmitted, which together with the appropriate B and R indications tell this mobile station to continue transmitting its packet. MS1, since it lost the contention with MS2, will inhibit all transmissions for a random time and then start searching for an indication that the channel has become idle again. In the fourth step, when mobile station MS2 has completed its transmission the channel will again be marked idle and, in this example, MS1 starts transmission of its packet. At 5, MS1 receives an indication that its first burst was correctly received.

From these illustrations, it can be seen how a mobile station, seeking random access within the system could encounter substantial difficulty in obtaining use of the packet data channel when either a great deal of packet traffic is present in the network or the packets being sent by the packet channel user are lengthy and therefore occupy the channel for extended periods of time.

Thus, there exists a need for an alternative solution within such radio telecommunication networks which enhance the packet data access by users within the system.

BRIEF SUMMARY OF THE INVENTION

In one aspect the present invention includes providing packet data access in a digital cellular communications network by incorporating a first random access scheme within the network in which packet data access for low traffic areas is provided only over a shared data channel and mobile stations seeking packet data access must compete with one another for usage of the channel. A second access scheme is provided within the network with which packet data access is provided over a random access channel which is used only for control signaling and short data messages and at least one polling data channel is used for sending larger quantities of data in high traffic areas between a mobile station and the network. Messages are broadcast over the control channel (BCCH) which indicate the presence and operative parameters of the second access scheme to all mobile stations. Access to the second access scheme is inhibited to all mobile stations which are not capable of communicating over both the first and second access schemes.

In another aspect, the invention includes improving the performance of a digital mobile radio communications network that includes a first random access packet data scheme by allocating the nonexclusive use of the first random access packet data scheme for packet data transmission within the mobile communication network by all mobile stations having packet data capability within the system. A second packet data access scheme is provided within the network which includes a second user data and control channel accessible only by a selected class of dual mode mobile stations capable of packet data transmission within both the first and second access schemes of the network and at least one data channel for exclusive use of the dual mode mobiles for sending packet data information in both directions between the mobile station and the network. Both the first and second access schemes may be provided by reallocating the existing channel structure within the radio network. Dual mode mobile stations may select to use the second packet data access scheme to which they have exclusive access based upon, for example, the number of collisions which are currently occurring on the packet data access channel to which all mobiles have access.

In yet another aspect, the present invention provides a method of providing a second packet access scheme into a radio system which has an existing access scheme. The second access scheme is provided in a manner which does not affect the existing mobile stations which are only capable of operating within the existing system.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION OF THE PREFERRED EMBODIMENT

As discussed above, a shared random access packet data channel has distinct disadvantages in a digital radio telecommunication system when packet traffic is heavy and/or large quantities of data need to be sent. The system of the present invention provides an improved solution to this situation by incorporating a second multiple access dedicated packet data scheme which is used simultaneously with the existing shared random access scheme. The system also provides for a second class of mobile station which has the capability of accessing either the first access scheme or both the first access scheme and the dedicated packet access scheme.

Figure 7:
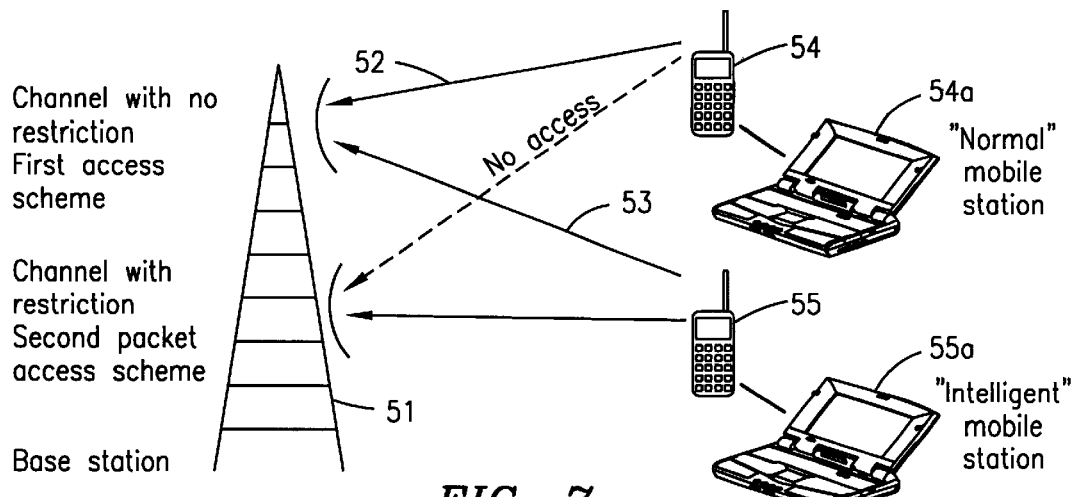
FIG. 7 is a pictorial diagram illustrating the addition of a separate parallel packet data access scheme within a digital cellular system having a random access packet data channel in accordance with the present invention.

As illustrated in FIG. 7, a base station 51 in a system constructed in accordance with the present invention, includes means for providing random access attempts 52 and 53 from a pair of mobile stations 54 and 55 each of which include, respectively, packet data access capabilities 54a and 55a. The BCCH contains an indication of which packet channels are available within the system. Access to the first access scheme by the respective mobile stations 54 and 55 is accomplished by random access contention by the two mobile stations in response to information on the downlink UPCH for the first access scheme. In addition, mobile station 55 includes the additional capability of using a second dedicated packet access scheme incorporated as part of the system of the present invention. The first access scheme, available to both mobile stations 54 and 55, includes only random packet access. The second access scheme, available to only mobile station 55, is dedicated packet traffic only. The mobile station 55 is, in effect, a dual mode mobile station having the capability of securing packet data access on either of the two schemes while the mobile station 54 only has the capability of access under the first random access scheme.

One exemplary technique for allowing access to the dedicated packet to only the limited group of dual mode mobiles capable of accessing both schemes is with the use of channel restriction parameters. Under present PDC standards, for example, a broadcast information message is sent on the downlink of the BCCH and on other channels from time to time. The broadcast information message contains numerous mandatory and optional parameters including packet channel structure information and channel restriction information. The channel restriction parameter combines one octet of data allowing for 256 combinations of bits. Presently, under current PDC standards, only 11 eight bit combinations are known to and recognizable by existing mobiles and used by the network to control access to the current random packet access scheme. Thus, bit combinations other than those 11 would be unrecognized and ignored by the older single mode mobiles which can only access the random packet access scheme. However, the new dual mode mobiles are programmed to recognize a group of new eight bit combinations in the channel restriction parameter (as well as the old combinations) and thereby know that the dedicated packet access channels are available to them.

Figure 1:
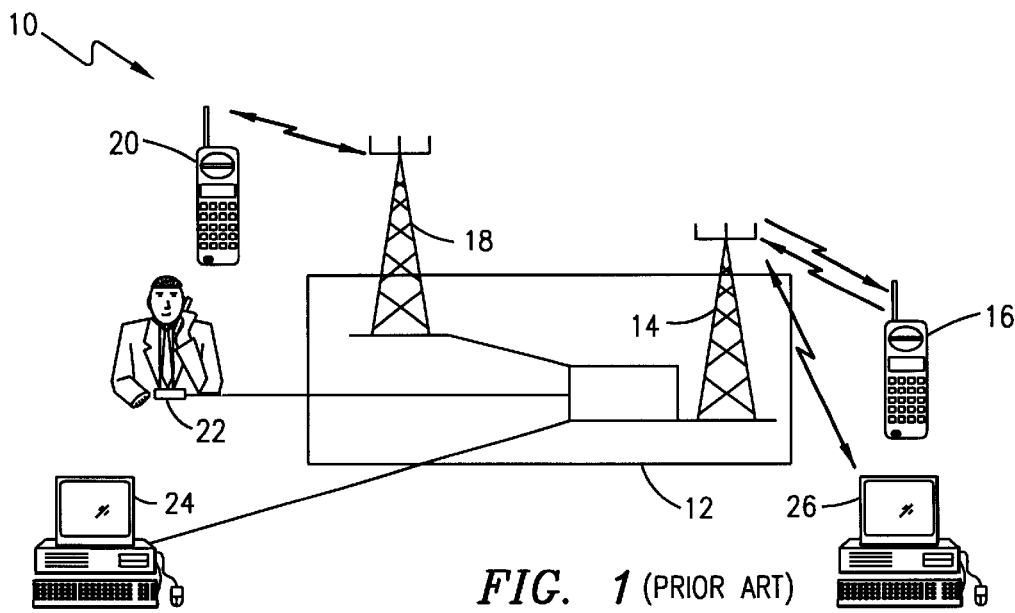
FIG. 1 is a pictorial block diagram illustrating a prior art radio telecommunications system.
Figure 2:
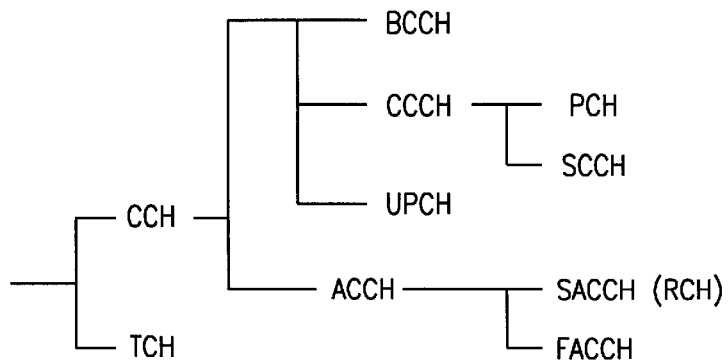
FIG. 2 is a diagram illustrating the radio channel structure within the air interface of an illustrative prior cellular system having a packet data channel.
Figure 3:
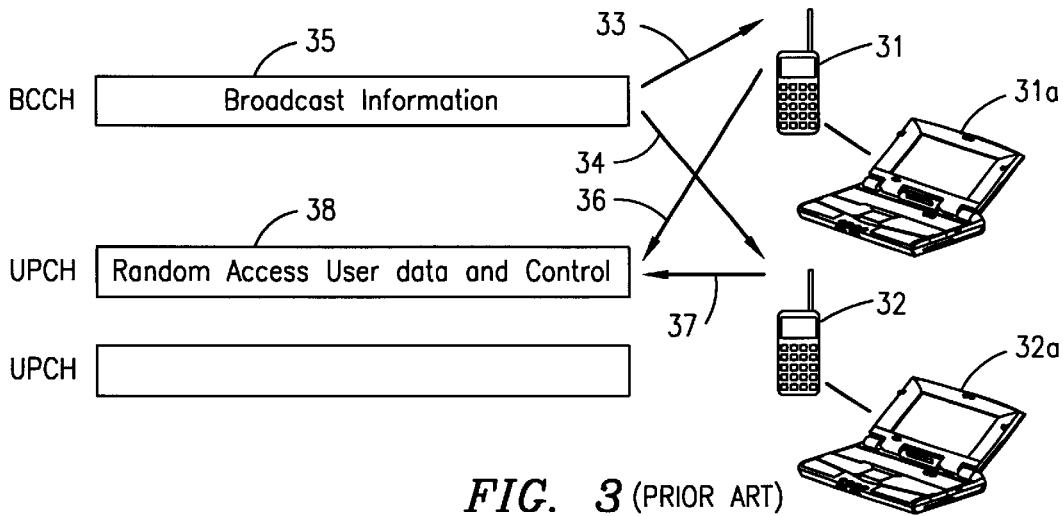
FIG. 3 is a diagram illustrating random access of a shared packet data channel in an illustrative prior art digital cellular system.
Figure 4:
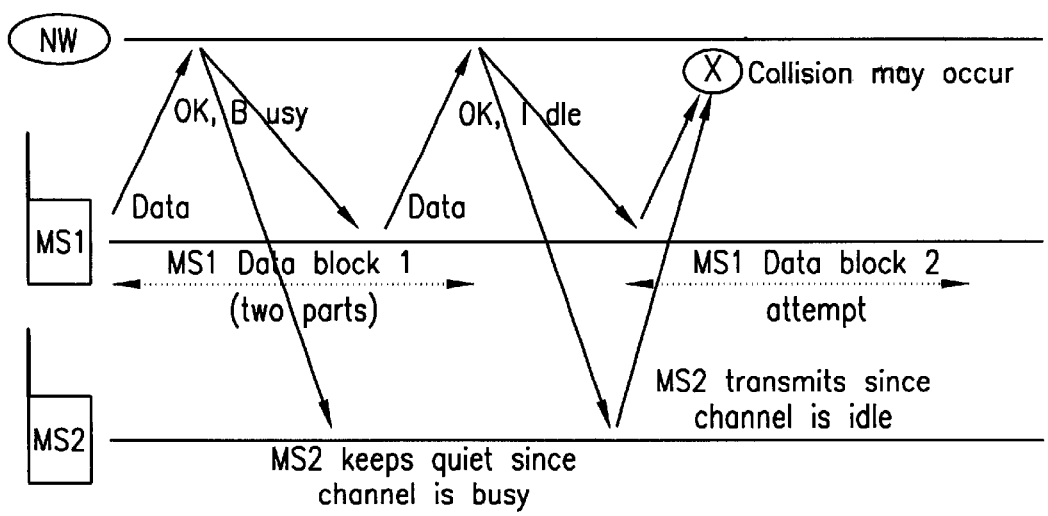
FIG. 4 is a pictorial diagram illustrating competition for a single random access packet data channel and possible collisions which may occur in a prior art system.
Figure 8:
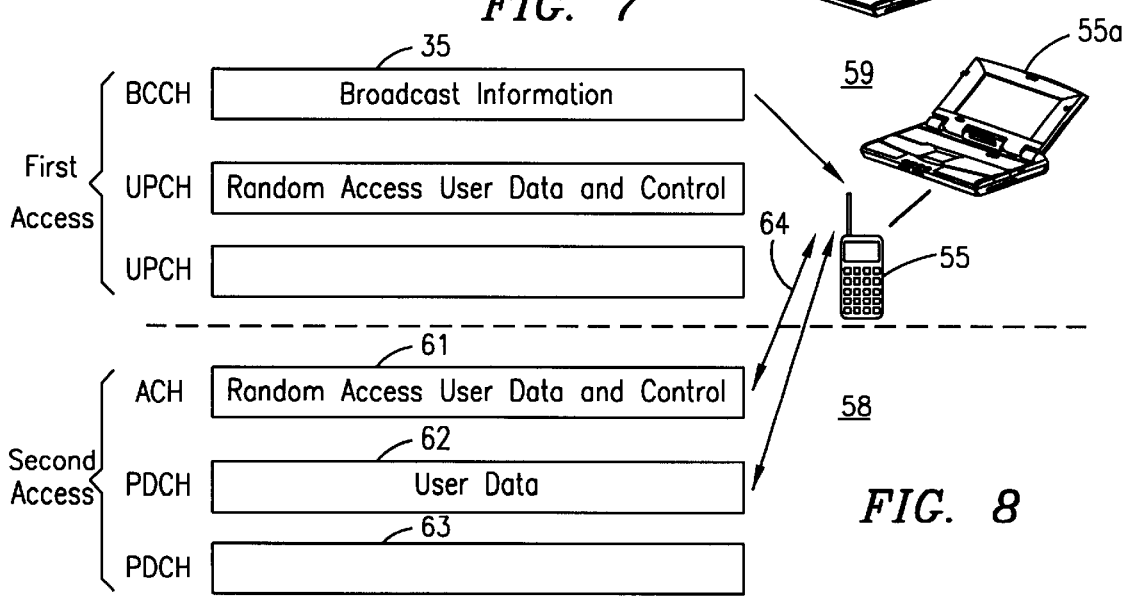
FIG. 8 is a pictorial diagram illustrating selective access of the separate parallel dedicated packet data channel in a system constructed in accordance with the teachings of the present invention.
Figure 9:
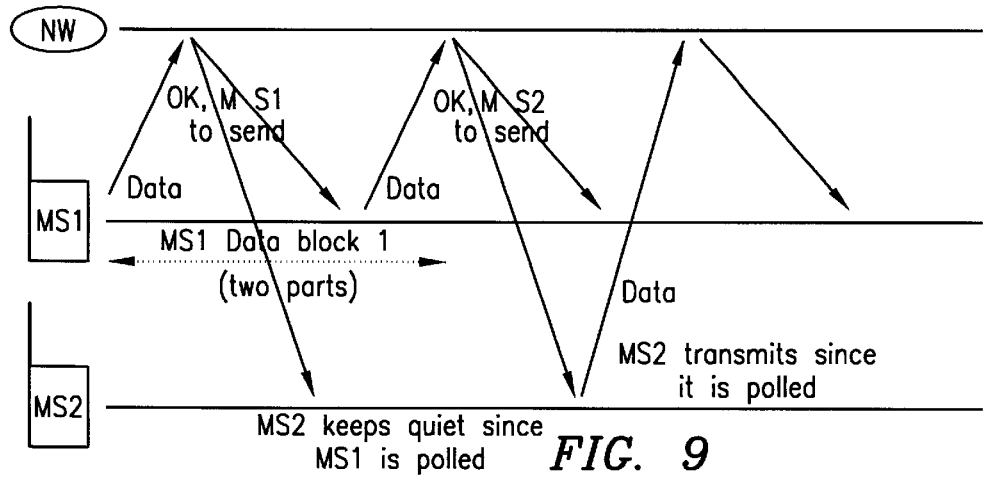
FIG. 9 is a pictorial diagram illustrating access to a parallel packet data access scheme incorporated into a network in accordance with the present invention.

Referring next to FIG. 8, there is shown a pictorial diagram illustrating use of the parallel multiple access schemes of the system of the present invention utilized by the dual mode mobile station 55. The first digital random access scheme 59 is essentially the same as that illustrated in the prior art system of FIG. 3 in which multiple mobile stations contend for random access to a packet data channel. The second multiple access scheme 58 may consist, for example, of one channel of random access type 61 and a number of channels which use the polling principle of access. In one exemplary embodiment, the random access channel 61 of the second access scheme comprises an access and control channel (ACH) which is used for control signaling and short data signals. In this embodiment, polling data channels (PDCH) 62 and 63 are used for larger quantities of data to be sent between the mobile station 55 and the network. Only the presence and the operative parameters of the random access channel (ACH) are communicated to all the mobile stations 54 and 55 on the BCCH 35; however, the channel restriction information on the BCCH tells the single mode mobiles 54 that this ACH is not available to them. A dual mode mobile station 55 which has a relatively large quantity of data to send to the network utilizes the present system of the present invention by sending a data registration signal 64 on the ACH. The network can then dynamically allocate one or more polling data channels PDCHs 62 and 63 depending upon the quantity of data to be sent. The network also allocates one or more PDCHs when there is data to be sent to a mobile station. For the polling data channels, PDCHs, either a standard polling scheme, such as in accordance with one of the options of the high level datalink control (HDLC), for example, or a messaging scheme of the type set forth below can be used. The burst structure of the type described above in connection with FIGS. 5 and 6 contains an E field for the administration of collision control bits. In this exemplary embodiment of a possible second access scheme, however, the E field is replaced by flag patterns which are controlled by the network. Each pattern is associated with a specific mobile station and, when recognized, allows it to send its data to the network. The layer 1 uplink scheme of this exemplary second access scheme is illustrated in FIG. 9. The use of polling flags on the PCDH uses the same burst format as, but not the same content as, the use of the E-bits in the random access channel.

Figure 5:
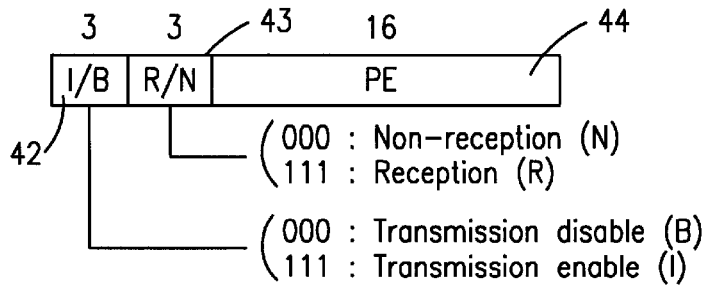
FIG. 5 is a diagram illustrating the downlink signaling format within a control channel of a prior digital cellular system illustrating collision control messaging.
Figure 6:
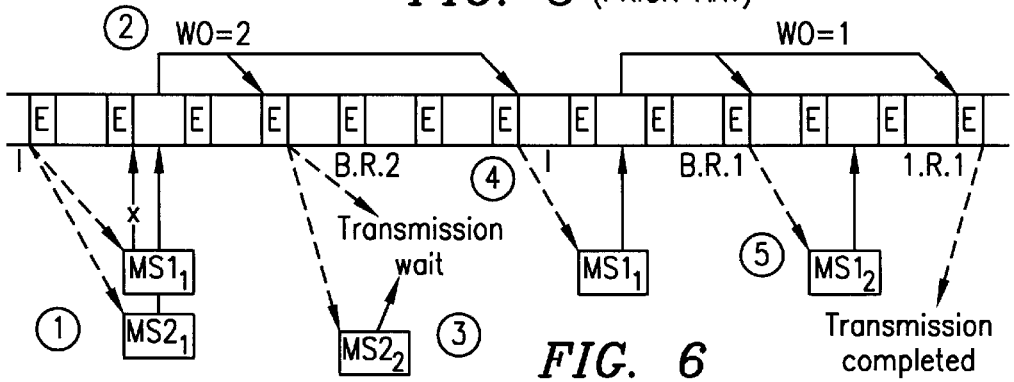
FIG. 6 is a diagram illustrating random access for communication by two separate mobile stations, both seeking random packet access to a base station in a prior art digital cellular system.

One goal in a possible embodiment of a second access system is to minimize the changes in the existing system necessary to implement the new system. For example, the existing downlink signaling format for the control channel is shown in FIG. 5 and discussed above. This format contains an E field which is 22 bits in length and which is used in the existing random access to control packet collisions. In this exemplary second access scheme, the technique of controlling access by the various mobiles seeking access to the PDCH is to replace the collision control bits of the E field with a six bit "flag pattern" repeated 3 times (18 bits) for redundancy. This will give a maximum number of 64 possible combinations. When a dual mode mobile registers with the system on the ACH to obtain access for sending data packets on the PDCH it is assigned one particular flag pattern. That mobile may only send data after it recognizes its own flag pattern as having been broadcast by the network over the PDCH on the downink indicating that mobile's turn to send packets to the network on the uplink PDCH. For example, a mobile which has recognized its unique flag pattern in the E field may, 190 symbols after the interface between the syncword and color code broadcast by the network, start sending bursts and continue for up to 18 bursts in a single layer 2 message. Thereafter, the network resumes control and sends the flag pattern of a different mobile on the downlink PDCH in the E field giving a different mobile the opportunity to send packets. The allocation of a specific time to send packets to each mobile means that there will be no collisions on the PDCH. The present system allows the same burst format to be used on both the existing random access packet channel and the dedicated PDCH.

Figure 10:
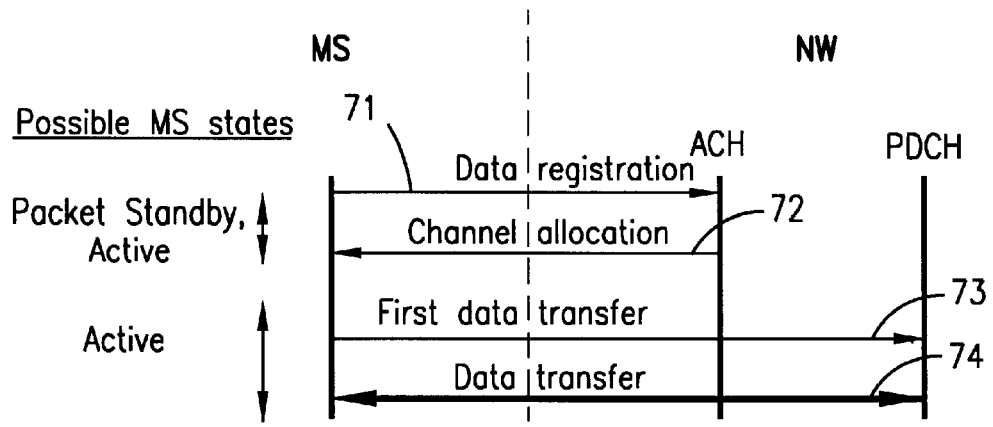
FIG. 10 is a signaling diagram illustrating large quantity data transfer initiated by a mobile station in a system constructed in accordance with the present invention.
Figure 11:
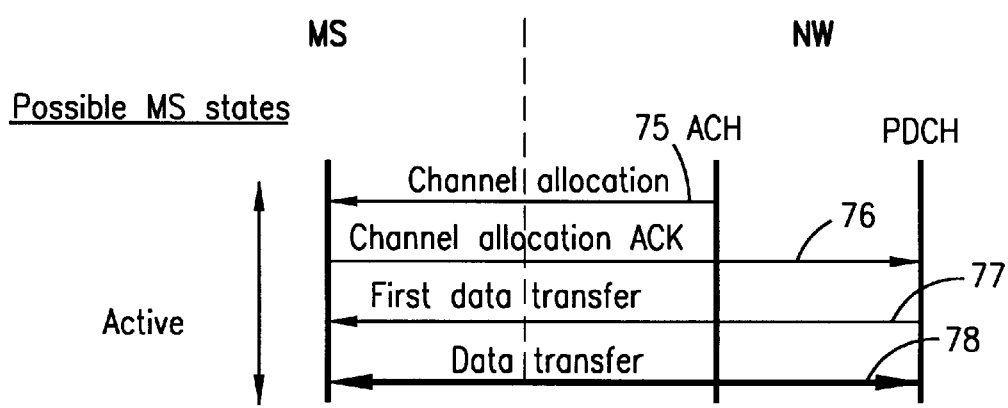
FIG. 11 is a signaling diagram illustrating large quantities of data transfer initiated by the network when a mobile station is in active state in a system constructed in accordance with the present invention.
Figure 12:
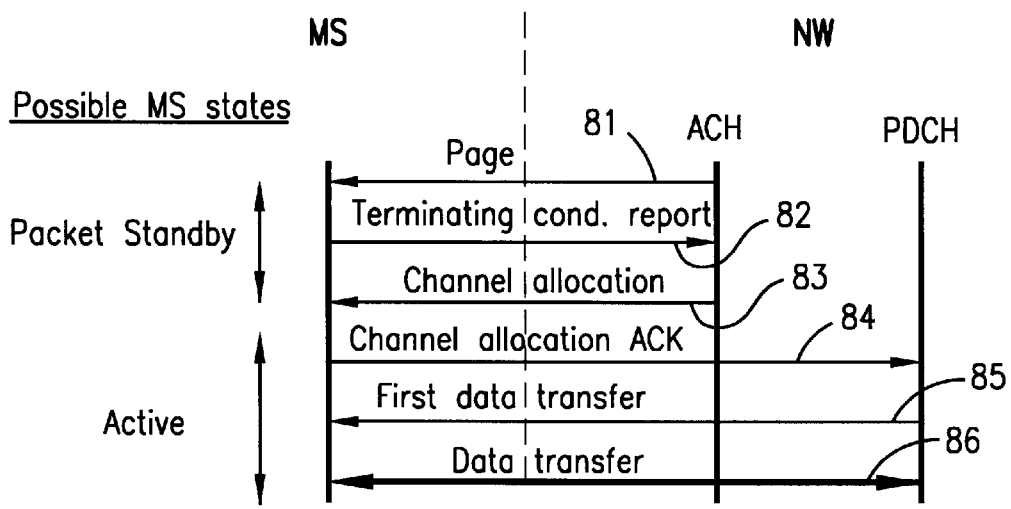
FIG. 12 is a signaling diagram illustrating large quantities of data transfer initiated by the network when a mobile station is initially in a packet standby state in a system constructed in accordance with the present invention.

This technique of the first exemplary embodiment described above greatly enhances the efficiency of packet data access in a system over both the purely random access system as well as GSM-like systems which offer a mobile the opportunity to continue to maintain ownership of the packet channel (by continuing to request ownership after sending repeated units of packet data). This exemplary embodiment of the system of the present invention provides a much fairer allocation of packet data resources to all the mobiles in the system. As shown in FIGS. 10–12 for one exemplary embodiment of a second access, there are a number of different traffic situations wherein the messaging scheme outline should be used.

For example, in FIG. 10 there illustrates a situation in which transfer of a large quantity of data is to be initiated by the mobile station. First, the mobile station (MS) sends a data registration message 71 to the network (NW) on the random access channel (ACH). Thereafter, the network sends a channel allocation message 72 back to the mobile station which then enters the active mode and performs a first data transfer 73 from the mobile station to the network via the polling data channel (PCDH). Thereafter, multiple units, each comprising large quantities of data 74 may be transferred in both directions between the mobile station and the network.

Similarly, FIG. 11 illustrates large quantities of data transfer initiated by the network when the mobile station is in active state. In this instance, the network issues a channel allocation message 75 on the random access channel (ACH) to the mobile station which transmits a channel allocation acknowledgment (ACK) 76 on the packet data channel (PDCH) to the network. A first data transfer 77 takes place on the PDCH from the network to the mobile station and thereafter large quantities of data transfer 78 take place in both directions between the mobile station and the network on the PDCH.

Finally, FIG. 12 illustrates large quantities of data transfer initiated by the network when the mobile station is in a packet standby state wherein in order to save power, the mobile listens less frequently to messages sent by the network. In this instance, a page message 81 is sent on the random access (ACH channel) from the network to the mobile station and the mobile responds with a terminating condition report message 82 on the ACH. The network responds with a channel allocation message 83 to the mobile station who forwards a channel allocation acknowledgment 84 on the PDCH back to the network. A first data transfer 85 takes place on the PDCH from the network to the mobile station followed by large quantity data transfers 86 in both directions between the mobile station and the network.

A second exemplary embodiment of a second access scheme in the multiple access scheme of the present invention might be similar to the first. However, instead of sequentially and cyclically polling the various mobiles and sequentially and cyclically allocating access in accordance with unique flag patterns as described above, a mobile could be allocated access to the PDCH and allowed to send packets continuously as long as it had any to send. This would also prevent collisions on the PDCH and allow more efficient handling of large amounts of packet data in the network over the single random access system. It would not give each mobile as fair an access to the packet system as in the first exemplary embodiment.

The provision of two parallel access packet data channels, one accessible by all mobiles in the network and the other selectively accessible by dual mode mobiles, can be used in existing systems with random access packet data channels without effecting their existing functions. Minimal change to existing standards, such as PDC, are required to implement the system of the present invention.

The availability of access by mobile stations to one or the other of the dual access schemes of the present invention is controlled by a channel restriction information element, i.e. a parameter, included, for example, within the layer 3 downlink messages called "Broadcast Information," "Zone Information Notification," and "Packet System Information" within the PDC standard used herein as an exemplary embodiment of the invention. This parameter is presently used in PDC to prevent too many mobile stations from using one specific random access channel. In the present invention, this parameter is assigned a value which prevents mobile stations which do not have the capability to communicate on both the conventional random access scheme and the second access scheme from being able to access the latter. Only the "dual-mode" mobiles are allowed by the broadcast parameter to access both schemes. Dual mode mobile stations may be attracted to the second access scheme by selected values of the same parameters used to exclude non-dual mode mobiles from access or by the receipt of information over the BCCH channel which indicates, for example, the number of collisions which are currently occurring on the first random access scheme open to all mobiles.

The present invention enhances the facility of the existing radio telecommunications networks by adding increased capacity on several bases: (1) no collisions will occur on the second access scheme giving superior packet transfer behavior at medium and high traffic loads within the network; (2) the messages sent on the first access scheme will be very short (with no or only very limited data transmissions) which also decreases the probability of collision between dual mode mobiles accessing this alternative channel and is more suitable for low traffic areas; and (3) the second access scheme is dynamically allocated for usage by the mobile stations according to the amount of data to be transmitted.

The method and system of the present invention also allows a flexible assignment of available packet data resources for each cell. In low traffic cells a single random access packet data channel scheme may be preferred because of lower cost. However, for higher traffic densities, either in numbers of mobiles seeking access for packet data transmission or the larger quantities of data to be sent between mobile stations and the network, a base station which supports both access schemes is considerably more efficient. The provision of the additional access channels may be made by changing the set up parameters for the channels within a cell. The currently available channel structure within each cell is communicated to the mobile stations through normal broadcast procedures.

Although preferred embodiments of the method and apparatus of the present invention have been illustrated in the accompanying drawings and described in the foregoing description, it is understood that the invention is not limited to the embodiment(s) disclosed but it capable of numerous rearrangements, modifications and substitutions without departing from the spirit of the invention as set forth and defined in the following claims.

What is claimed is:

1. A method for providing packet data access in a digital cellular communications network which includes:
   providing a broadcast control channel (BCCH) over which the network broadcasts system control information to mobile stations in the network;
   providing a first random access scheme within said network in which packet data access for low traffic areas is provided over a data channel and mobile stations seeking packet data access compete with one another for use of the channel based upon channel availability messages broadcast to all mobile stations;
   providing a second access scheme comprising at least a polling data channel (PDCH), within said system in which packet data access for high traffic areas is provided for sending larger quantities of data between a mobile station and the network;
   broadcasting messages over said control channel (BCCH) which indicate the presence and operative parameters of the channels utilizing said second access scheme to all mobile stations; and
   allowing access to the channels utilizing said second access scheme to only mobile stations which are capable of communicating over both the channels utilizing said first and second access schemes, said mobile stations that are capable of communicating over both channels send a registration signal on a random access channel (ACH) so that said network can allocate at least one polling data channel (PDCH).

2. A method for providing packet data access in a digital cellular communications network as set forth in claim 1 wherein said access allowing step includes:
   broadcasting control messages over said BCCH which include an information parameter which is interpreted by all mobile stations which are not capable of communications over both of said first and second access schemes as indicating that all channels utilizing said second scheme are not available.

3. A method for providing packet data access in a digital cellular communications network as set forth in claim 1 wherein said access allowing step also includes:
   broadcasting control messages over said BCCH which include an information parameter which is interpreted by all mobile stations which are capable of communications over both of said first and second access schemes as indicating that said second scheme is available to them and attracts said mobile stations to the channels utilizing said second scheme rather than the channels utilizing said first scheme.

4. A method for providing packet data access in a digital cellular communications network as set forth in claim 1 wherein said first access scheme also includes:
   broadcasting on the downlink of the channel messages which include a collision control bit field indicating whether the uplink of the shared channel is idle or busy.

5. A method for providing packet data access in a digital cellular communications network as set forth in claim 1 wherein said method further includes the additional step of:

broadcasting on the polling access channel messages which include a flag pattern field indicating which mobile can send its data to the network on the channel utilizing said second access.

6. A method for improving the performance of a digital mobile radio communications network that includes a first random access packet data scheme, comprising the steps of:

allocating the nonexclusive use of the channels utilizing said first random access packet data scheme for packet data transmission within said mobile communication network by all mobile stations having packet data capability within the system;

providing a second packet data access scheme comprising of at least a polling data channel (PDCH) within said network which includes the additional steps of:

providing a second random access user data and control channel accessible only by a selected class of dual mode mobile stations capable of packet data transmission within both said first and second access schemes of said network;

requiring receipt of a data registration signal from a dual mode mobile station on an access and control channel associated with said second packet data access scheme; and allocating at least one polling data channel for use exclusively by a plurality of said dual mode mobiles for sending packet data information in both directions between the mobile station and the network.

7. A method as set forth in claim 6 wherein the channels of both said first and second access schemes are provided by reallocating the existing channel structure within said radio network.

8. A method as set forth in claim 6 wherein the channels of both said first and second access schemes employ the same burst format.

9. A method as set forth in claim 6 wherein said dual mode mobile stations may select to use the second packet data access scheme to which said plurality of dual mode mobiles have access to in response to a plurality of collisions occurring on the packet data access channel to which all mobiles have access.

10. A method for providing a second multiple access scheme in an existing digital cellular communications system without affecting mobiles designed according to the standards of said existing system in which said existing system includes a random packet access scheme wherein packet data access for low traffic areas is provided over a data channel and mobile stations seeking packet data access compete with one another for use of the channel based upon channel availability messages broadcast to all mobile stations, said method comprising:

providing a second access scheme comprising at least a polling data channel (PDCH) within said existing system in which packet data access for high traffic areas is provided for sending larger quantities of data between a mobile station and the network;

broadcasting messages on the control channel (BCCH) of said existing system, said messages indicating the presence and operative parameters of the channels which are utilizing said second access scheme; and allowing access to channels utilizing said second access scheme to only mobile stations which are capable of communicating over channels utilizing both said existing and said second access schemes and which have provided a data registration signal on an access and control channel (ACH) associated with said second access scheme.

11. A method for providing a second multiple access scheme in an existing digital cellular communications system as set forth in claim 10 wherein said allowing access step further includes:

broadcasting control messages over said existing BCCH which include an information parameter which is interpreted by all mobile stations which are designed in accordance with the standards of said existing system and not capable of communications over both of said existing and second access schemes as indicating that all channels utilizing said second scheme are not available.

12. A method for providing a second access scheme in an existing digital cellular communications system as set forth in claim 10 wherein said allowing access step also includes:

broadcasting control messages over said existing BCCH which include an information parameter that is interpreted by all mobile stations which are capable of communications over both of said existing and said second schemes as indicating that said second scheme is available to them and which requests said mobile stations to channels utilizing said second scheme rather than channels utilizing said existing scheme.

13. A method for providing a second access scheme in an existing digital cellular communications system as set forth in claim 10 wherein said first access scheme also includes:

broadcasting on the downlink of the channel messages which include a collision control bit field indicating whether the uplink of the shared channel is idle or busy.

14. A method for providing a second access scheme in an existing digital cellular communications system as set forth in claim 10 wherein said method further includes the additional step of:

broadcasting on the polling data channel messages which include a flag pattern field indicating which mobile can send its data to the network on the channel utilizing said second access.

15. A system for providing packet data access in a digital cellular communications network which includes:

means for providing a broadcast control channel (BCCH), said broadcast control channel being utilized to broadcast system control information to mobile stations in a network;

means for providing a first random access scheme within said network in which packet data access for low traffic areas is provided over a data channel and mobile stations seeking packet data access compete with one another for use of the channel based upon messages broadcast on the downlink of the channel utilizing said first random access scheme;

means for providing channels utilizing a second access scheme which includes a polling data channel within said system in which packet data access for high traffic areas is provided for sending larger quantities of data between a plurality of mobile stations and the network;

means for broadcasting messages over said control channel (BCCH) which indicate the presence and operative parameters of the channels utilizing said second access scheme to all mobile stations; and means for allowing access to channels utilizing said second access scheme to only mobile stations which are capable of communicating over both said first and second access schemes and which send a data registration signal to said network via an access and control channel associated with said second access scheme.

16. A system for providing packet data access in a digital cellular communications network as set forth in claim 15 wherein said means for allowing access includes:

means for broadcasting control messages over said BCCH which include an information parameter which is interpreted by all mobile stations which are not capable of communications over both of said first and second access schemes as indicating that the channels utilizing said second scheme are not available.

17. A system for providing packet data access in a digital cellular communications network as set forth in claim 15 wherein said access allowing means also includes:

means for broadcasting control messages over said BCCH which include an information parameter which is interpreted by all mobile stations which are capable of communications over both of said first and second access schemes as indicating that the channels utilizing said second scheme are available to them and attracts said mobile stations to the channels utilizing said second scheme rather than the channels utilizing said first scheme.

18. A system for providing packet data access in a digital cellular communications network as set forth in claim 15 wherein said first access scheme also includes:

means for broadcasting messages on the downlink of the channel utilizing said first access scheme which include a collision control bit field indicating whether the shared channel is idle or busy.

19. A system for providing packet data access in a digital cellular communications network as set forth in claim 15 wherein said second access scheme and said system also includes:

means for broadcasting on the polling data channel messages which include a flag pattern field indicating which mobile can send its data to the network on the channel utilizing said second access.

20. A system for improving the performance of a digital mobile radio communications network that includes a first random access packet data scheme, comprising:

means for allocating the nonexclusive use of channels utilizing said first random access packet data scheme for packet data transmission within said mobile communication network by all mobile stations having packet data capability within the system;

means for providing channels utilizing a second packet data access scheme within said network which includes:

means for providing a second random access user data and control channel accessible only by a selected class of dual mode mobile stations which are capable of packet data transmission within both said first and second access schemes of said network; and means for allocating at least one polling data channel for exclusive use of said dual mode mobiles using the second access for sending packet data information in both directions between the mobile station and the network.

21. A system as set forth in claim 20 wherein the channels of both said first and second access schemes are provided by reallocating the existing channel structure within said radio network.

22. A system as set forth in claim 20 wherein the channels of both said first and second access schemes employ the same burst format.

23. A system as set forth in claim 20 wherein a plurality of said dual mode mobile stations may select to use the second packet data access scheme in response to collisions which are occurring on the packet data access channel.

* * * * *

UNITED STATES PATENT AND TRADEMARK OFFICE
CERTIFICATE OF CORRECTION

PATENT NO. : 6,226,279 B1
DATED : May 1, 2001
INVENTOR(S) : Rolf Hansson et al.

Page 1 of 1

It is certified that error appears in the above-identified patent and that said Letters Patent is hereby corrected as shown below:

Column 8,
Line 5, delete "downink" replace with -- downlink --

Column 11,
Lines 13-14, delete "comprising of at least" replace with -- comprising at least --

Column 14,
Lines 18-19, delete "dual mode mobiles using the second access for sending packet" replace with -- dual mode mobiles using the second access scheme for sending packet --

Signed and Sealed this

Second Day of April, 2002

Attest:

Attesting Officer

JAMES E. ROGAN
Director of the United States Patent and Trademark Office